US009584356B2

(12) United States Patent
Gressus et al.

(10) Patent No.: US 9,584,356 B2
(45) Date of Patent: Feb. 28, 2017

(54) SECURED ELEMENT FOR PERFORMING A USER AUTHENTICATION AND USER AUTHENTICATION METHOD

(75) Inventors: Yvon Gressus, Meudon (FR); Benoit Arnal, Meudon (FR); Bernard Deniau, Meudon (FR)

(73) Assignee: GEMALTO SA, Meudon (FR)

(*) Notice: Subject to any disclaimer, the term of this patent is extended or adjusted under 35 U.S.C. 154(b) by 478 days.

(21) Appl. No.: 14/122,009

(22) PCT Filed: May 24, 2012

(86) PCT No.: PCT/IB2012/001020
§ 371 (c)(1),
(2), (4) Date: Nov. 25, 2013

(87) PCT Pub. No.: WO2012/160438
PCT Pub. Date: Nov. 29, 2012

(65) Prior Publication Data
US 2014/0087696 A1 Mar. 27, 2014

(30) Foreign Application Priority Data

May 25, 2011 (EP) .................................. 11305637

(51) Int. Cl.
*H04L 29/06* (2006.01)
*H04W 12/06* (2009.01)
(52) U.S. Cl.
CPC ........... *H04L 29/06* (2013.01); *H04L 63/0853* (2013.01); *H04L 63/18* (2013.01); *H04W 12/06* (2013.01)
(58) Field of Classification Search
CPC .......... H04L 63/08; H04L 63/10; H04L 29/06; H04L 63/0853; H04L 63/18; G06F 21/31; H04W 12/06; H04W 88/02; H04N 21/4126

USPC .................. 455/410, 411, 418; 704/246, 273
See application file for complete search history.

(56) References Cited

U.S. PATENT DOCUMENTS

| 2006/0233149 A1* | 10/2006 | Rustagi ................... G06F 21/10 370/342 |
| 2007/0190975 A1* | 8/2007 | Eonnet .................... H04L 63/18 455/411 |
| 2008/0141353 A1 | 6/2008 | Brown |

(Continued)

FOREIGN PATENT DOCUMENTS

EP 2182493 A1 5/2012

OTHER PUBLICATIONS

PCT/IP2012/001020 International Search Report, Oct. 2, 2012, European Patent Office, P.B. 5818 Patentlaan 2 NL—2280 HV Rijswijk.

(Continued)

*Primary Examiner* — Thai Vu
(74) *Attorney, Agent, or Firm* — The Jansson Firm; Pehr B. Jansson

(57) ABSTRACT

The invention relates to a secured element (9) including: —a communication interface (91); —an integrated circuit comprising a security module (93) comprising encryption based security features and configured to process authentication requests received on the communication interface. The secured element further. includes a MEMS microphone (94), said microphone being configured to capture a sound sequence and to provide the captured sound sequence to the security module.

6 Claims, 2 Drawing Sheets

Fig. 1

(56) References Cited

U.S. PATENT DOCUMENTS

2008/0307515 A1* 12/2008 Drokov .................. G06Q 20/32
726/7
2009/0061888 A1  3/2009 Eonnet et al.

OTHER PUBLICATIONS

Esa Tiiliharju, et al: "Ultra-wideband CMOS-MEMS radio", Ultra-Wideband, 2009. ICUWB 2009. IEEE International Conference on, IEEE, Piscataway, NJ, USA, Sep. 9, 2009, pp. 102-106, XP031547620, ISBN: 978-1-4244-2930-1 abstract.

* cited by examiner

SECURED ELEMENT FOR PERFORMING A USER AUTHENTICATION AND USER AUTHENTICATION METHOD

BACKGROUND

The present invention generally relates to the authentication methods, and more particularly to the methods for authenticating an end user by a service, for instance a multimedia broadcasting service.

Given the wide choice proposed by remote multimedia providers, an increasing number of customers use remote services like video on demand or music streaming. Many service providers restrict their services to their customers. Registration and service use may be fared before the user is given access to the multimedia stream. Service providers may perform a user authentication, in order to bill the authenticated user for, the service. The service provider then leaves the user access the multimedia content.

One known authentication method comprises the following steps:

The remote service provider sends an authentication password (also named One Time Password), either by mail, by SMS or by display on the user's. TV screen through his decoder. By inputting it on his mobile phone and sending it back to the service provider, the user authenticates and validates the service billing as well. The service provider may for instance compare the password initially sent with the user input.

However, such an authentication method is considered as annoying by customers. The user has to pay attention when inputting a long and meaningless password; if he inputs a wrong password, he has to type it anew to perform the authentication. Moreover, since the user input has to remain user friendly, the service provider can only request the user to input relatively short passwords. Therefore, the security level provided by the authentication is relatively low.

Thus, there is a need for a reliable and user friendly authentication method.

SUMMARY OF THE INVENTION

The invention relates to a secured element including:
a communication interface;
an integrated circuit comprising a security module comprising encryption based security features and configured to process authentication requests received on the communication interface.

The secured element further includes a MEMS microphone, said microphone being configured to capture a sound sequence and to provide the captured sound sequence to the security module.

According to an embodiment, the security module is configured to receive authentication data from said communication interface and configured to determine the matching between the authentication data and the captured sound sequence.

According to another embodiment, the secured element further comprises a converter configured to convert the captured sound signal into a binary string and configured to provide said binary string to the security module.

According to still another embodiment, said converter is a dual-tone multi-frequency converter.

The security module may be configured to receive an authentication string from said communication interface and configured to determine the matching between the authentication string and the binary string.

The security module may also be configured to
generate a confirmation of the matching;
sign said confirmation;
emit the signed confirmation on said communication interface.

According to a further embodiment, the converter and the secure module are integrated in a same chip.

The invention also relates to a remote service system, comprising:
a secured element such as recited before;
a remote server, remotely accessible by said secured element, configured to:
send an authentication request to the secured element;
send a sound sequence to be played by a sound playing system;
check a user authentication based on the matching between the sound sequence captured by the secured element and corresponding authentication data;
provide an access to a service when the captured sound sequence matches the authentication data.

According to an embodiment, the remote server is configured to send said authentication data to the secured element.

The invention further relates to an authentication method, comprising the steps of:
sending an authentication request to a secured element;
sending a sound sequence to a sound playing system and playing said sound sequence on the sound playing system;
capturing said sound sequence through a MEMS microphone integrated in a secured element;
checking the matching between the captured sound sequence and corresponding authentication data.

According to an embodiment, the method further comprises a step of sending authentication to the secured element, said checking step being performed by the secured element.

BRIEF DESCRIPTION OF THE DRAWINGS

The advantage of the present invention will become apparent from the following description of several embodiments with reference to the accompanying drawings, in which.

DETAILED DESCRIPTION

The invention proposes to perform an authentication based on a sound sequence captured by the MEMS microphone of an integrated circuit. The captured sound sequence is provided to a security module of the integrated circuit.

An authentication according to the invention is particularly convenient for the end user. He does no longer have to input long passwords and the authentication duration is strongly reduced. As the user input is not a limitation to the authentication security level anymore, this security level, can be strongly improved by increasing the amount of authentication data. As a suitable general purpose security element like a SIM card can be used to perform this authentication. Advantageously, the authentication according to the invention can be performed without requesting any additional infrastructure to communicate. No additional reader (like a NFC reader for instance) is necessary. Thus, the service does not require distributing additional hardware. The service does not require the user to manipulate such hardware either.

Figure 1:
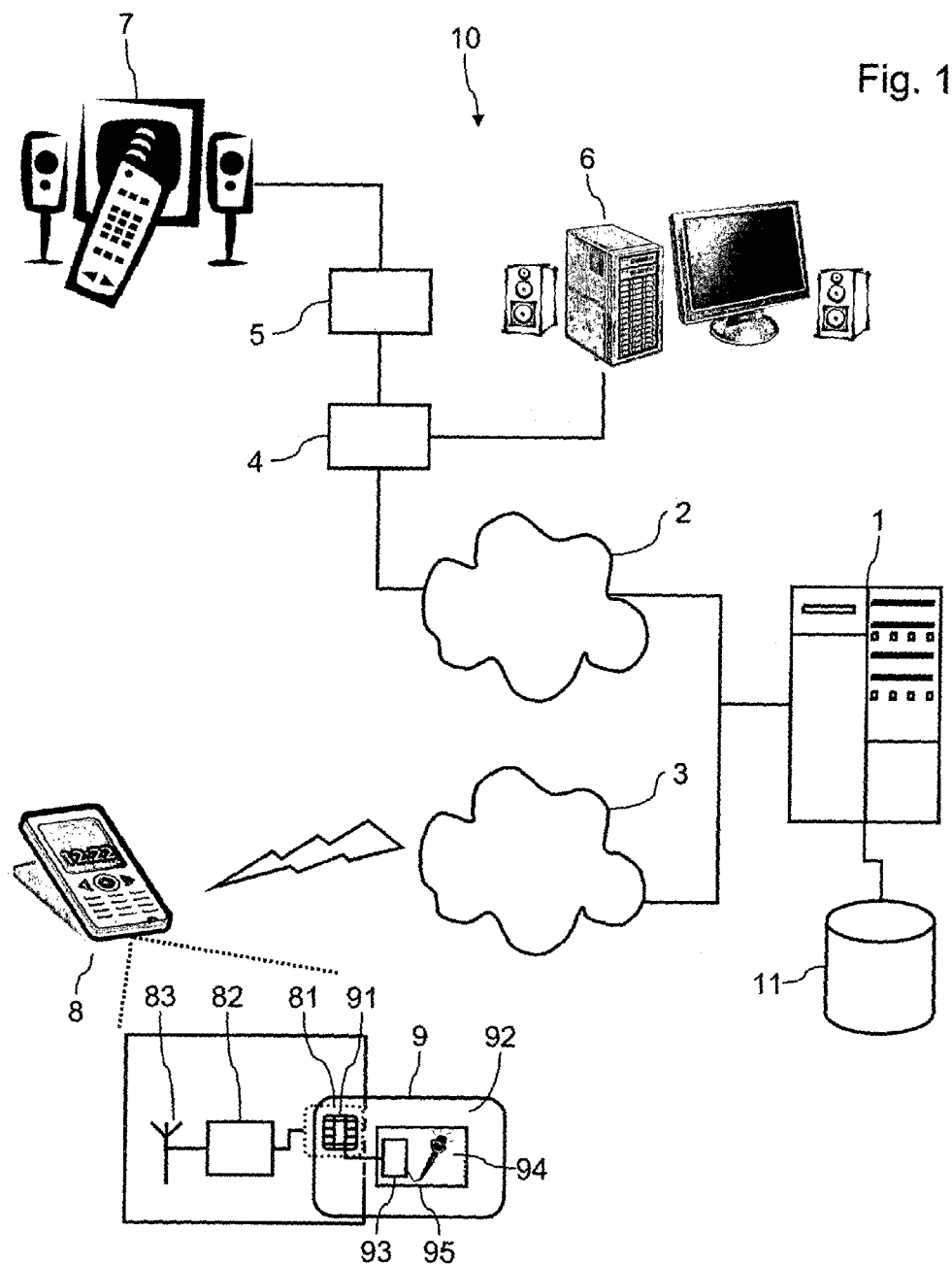
FIG. 1 is a schematic view of an embodiment of a system performing an authentication method according to the invention.

FIG. 1 is a schematic view of a multimedia broadcasting and rendering system 10. The multimedia system 10 includes a remote broadcasting server 1 having an access to a multimedia content database 11. The system 10 also includes a mobile terminal 8, a computer terminal 6 and a multimedia playing device 7. The multimedia playing device 7 notably includes a television screen and additional or integrated loudspeakers. The system 10 also includes a secured element 9 inserted in a connection slot 81 of the mobile terminal 8.

The user is provided with a modem 4 to communicate with the remote broadcasting server 1 through an Internet network 2. The computer terminal 6 is connected to the modem 4 and is provided with loudspeakers. The computer terminal 6, can thereby receive a multimedia stream from the server 1. The computer terminal 6 is configured to play on its loudspeakers a sound sequence issued by server 1 and forwarded by modem 4.

A multimedia decoder 5 is connected to the modem 4. The multimedia playing device 7 is connected to the decoder 5. The multimedia playing device 7 can thereby receive a multimedia stream from the server 1. The multimedia playing device 7 is configured to play on its loudspeakers a sound sequence issued by server 1 and forwarded by decoder 5.

Server 1 can communicate with the mobile terminal 8 through a mobile communication network 3, like a UMTS or a GSM network. The mobile terminal 8 notably includes an antenna 83 configured to communicate through the mobile communication network 3. The mobile terminal 8 also includes a processing device 82 and a SIM card reader slot 81.

A SIM card 9 is hosted in said slot 81. The SIM card 9 is a secured element. Such a secured element is commonly used to perform a user authentication on a mobile terminal. Such a secured element can have any suitable format, for instance one of the standard UICC formats.

The SIM card 9 includes as known per se, a contact communication interface 91 accessible by connection pads of the slot 81 (for instance at the ISO 7816-2 format). The SIM card 9 further comprises an integrated circuit 95 connected to the communication interface 91 and embedded in a plastic card 92. The integrated circuit 95 includes a secured processing element 93 connected to the communication interface 91. The secured processing element 93 is designed to perform encryption based security features. The secured processing element 93 is notably designed to manage ciphering keys to cipher data flows and to authenticate the user of the mobile terminal 8 as known by someone skilled in the art.

The integrated circuit 95 further includes a MEMS Microphone 94. The MEMS microphone 94 is an acoustic-to-electric transducer or sensor that converts sound into an electrical signal. When submitted to an acoustic vibration, the MEMS microphone 94 provides a corresponding electrical signal to the secured processing element 93. The MEMS microphone 94 is thereby configured to capture a sound sequence and to provide the captured sound sequence to the secured processing element 93. The MEMS microphone 94 comprises a pressure-sensitive diaphragm etched directly into a silicon chip by MEMS techniques. The MEMS microphone 94 can thereby have a very small size, compliant with its integration into the SIM card 9.

Figure 2:
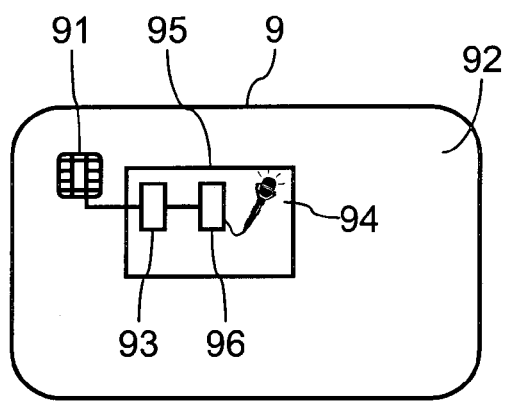
FIG. 2 is a schematic view of an example of a secured element according to an embodiment of the invention.

The MEMS microphone 94 may include an integrated preamplifier. As illustrated in FIG. 2, the MEMS microphone 94 may also have a built-in analog-to-digital converter 96 (ADC) circuit on the same CMOS chip making the chip a digital microphone and so more readily integrated in the secured element 9. Such a converter 96 can for instance provide a binary string to the secured processing element 93. The converter 96 may for instance be a dual-tone multi-frequency converter. Such a converter 96 is particularly adapted for its integration in a small size secured element 9 or in a secured element 9 having limited resources. Indeed, dual-tone multi-frequency coding is adapted for limited processing resources and is very resistant to sound distortions. Other kinds of converters 96 can be used as well. The converter 96 may for instance perform a FFT on the captured sound sequence or perform an envelope calculation on the captured sound signal.

The security module 93 is configured to receive an authentication request through the communication interface 91 and to process it. Further to the reception of an authentication request, the security module 93 may either perform the authentication or forward the captured sound sequence to the server 1. The authentication request may include configuration data to request the security module 93 either to perform the authentication or to forward the captured sound sequence to the server 1.

To process an authentication request, the security module 93 is configured to receive authentication data from server 1 through the communication interface 91. The security module 93 is also configured to determine the matching between the authentication data and the captured sound sequence. The security module 93 is configured to forward the result of the matching determination to the server 1, through the communication interface 91. The security module 93 may sign the result of the matching based on its security features.

If the security module 93 receives a binary, string representative of the captured sound signal, it determines the matching between this binary string and a binary authentication string received through interface 91. The security module 93 may decipher the binary string representative of the captured sound signal based on one encryption key.

The security module 93 may also determine if the FFT of the captured sound sequence matches a reference FFT received on communication interface 91. The security module 93 may also determine if the envelope calculated on the captured sound signal matches a reference envelope received on communication interface 91.

If the authentication request indicates that the captured sound sequence shall be forwarded to the server 1, the security module 93 may simply sign the captured sound sequence and transmit it to the server 1.

Figure 3:
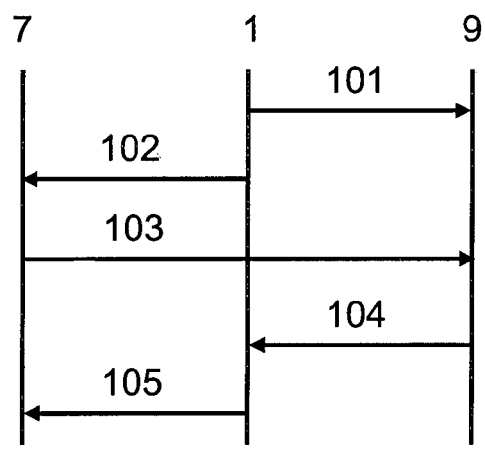
FIG. 3 illustrates the steps performed according to an authentication method according to a first embodiment.

FIG. 3 is a diagram illustrating the steps performed in a first embodiment of an authentication method according to the invention.

At step 101, the server 1 sends an authentication request to the secured element 9. The request indicates that the secured element 9 is in charge of performing the authentication. The authentication request also includes an authentication binary string. The secured element 9 activates an application in charge of capturing a sound sequence.

At step 102, server 1 sends a sound signal to the multimedia playing device 7, this sound signal corresponding to the authentication binary string.

At step 103, the multimedia playing device 7 plays the sound sequence. This sound sequence is detected and captured by the MEMS, microphone 94 of the secured element 9. The converter 96 converts the captured sound sequence into a binary string. The binary string is provided to the security module 93 of the secured element. The security module 93 deciphers the binary string based on an encryption key. The security module 93 then determines the matching between the deciphered binary string and the authentication binary string. The security module then generates a confirmation of the matching and digitally signs this confirmation.

At step 104, the secured element 9 sends the signed confirmation to the server 1.

At step 105, the server 1 receives the signed authentication confirmation. The server 1 then sends a multimedia stream from the database 11 to the multimedia playing device 7.

Figure 4:
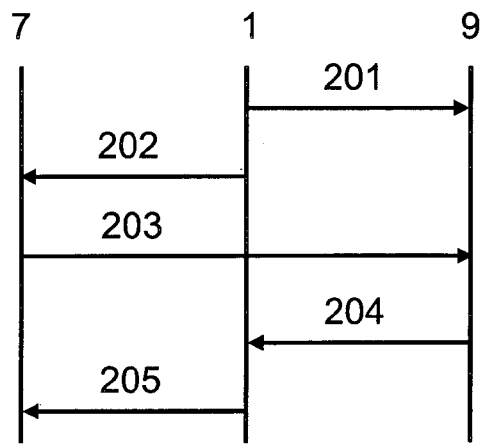
FIG. 4 illustrates the steps performed according to an authentication method according to a second embodiment.

FIG. 4 is a diagram illustrating the steps performed in a second embodiment of an authentication method according to the invention.

At step 201, the server 1 sends an authentication request to the secured element 9. The request indicates that the server 1 is in charge of performing the authentication. The secured element 9 activates an application in charge of capturing a sound sequence.

At step 202, server 1 sends a sound signal to the multimedia playing device 7.

At step 203, the multimedia playing device 7 plays the sound sequence. This sound sequence is detected and captured by the MEMS microphone 94 of the secured element 9. The converter 96 converts the captured sound sequence into a binary string. The binary string is provided to the security module 93 of the secured element. The security module 93 deciphers the binary string based on an encryption key. The security module 93 then digitally signs this deciphered binary string.

At step 204, the secured element 9 sends the signed binary string to the server 1.

At step 205, the server 1 determines the matching between the signed binary string and the sound sequence that was sent to the multimedia playing device 7. Once it has determined a correct matching, the server 1 sends a multimedia stream from the database 11 to the multimedia playing device 7.

Though the invention was described in its application to video on demand, the invention also applies to other applications where a secured element is used to perform a user authentication, for instance validating an internet access (computer terminal 6), performing a transaction on a vending machine or similar applications.

Though the invention was described with a server 1 managing both the multimedia broadcasting and the user authentication, server 1 can also delegate the authentication to a dedicated server.

The invention claimed is:

1. A secured element (9) comprising:
a communication interface (91);
an integrated circuit comprising:
  a security module (93) comprising encryption based security features and configured to process authentication requests received on the communication interface by receiving from a multi-media server an authentication binary string; and
  a MEMS (Microelectromechanical systems) microphone (94), said microphone being configured to capture a sound sequence produced by a multi-media device, the sound sequence corresponding to the authentication binary string transmitted to the multi-media device by the multi-media server, and to provide the captured sound sequence to the security module,
  the security module operable to compare the captured sound sequence to the authentication binary string and to transmit an authentication confirmation to the multi-media server by which the server proceeds with delivery of a multimedia stream to the multi-media device.

2. The secured element (9) according to claim 1, wherein the integrated circuit further comprises a converter (96) configured to convert the captured sound signal into a binary string and configured to provide said binary string to the security module.

3. The secured element according to claim 2, wherein said converter (96) is a dual-tone multi-frequency converter.

4. The secured element according to claim 1, wherein the security module is configured to:
sign said authentication confirmation;
transmit the signed authentication confirmation on said communication interface to said multi-media server.

5. A remote service system (10), comprising:
a secured element (9) having:
a communication interface (91);
an integrated circuit comprising:
  a security module (93) comprising encryption based security features and configured to process authentication requests received on the communication interface by receiving from a multi-media server an authentication binary string; and
  a MEMS (Microelectromechanical systems) microphone (94), said microphone being configured to capture a sound sequence produced by a multi-media device, the sound sequence corresponding to the authentication binary string transmitted to the multi-media device by the multi-media server, and to provide the captured sound sequence to the security module,
  the security module operable to compare the captured sound sequence to the authentication binary string and to transmit an authentication confirmation to the multi-media server by which the server proceeds with delivery of a multimedia stream to the multi-media device;
a multi-media server (1), remotely accessible by said secured element, configured to:
  send an authentication request to the secured element including an authentication binary string;
  send a sound sequence to be played by multi-media device;
  check a user authentication confirmation received from the secured element and based on the matching between the sound sequence captured by the secured element and corresponding authentication binary string;
  provide an access to a service when the captured sound sequence matches the authentication binary string.

6. An authentication method for operating a multimedia device, a secured element having an integrated circuit card with a MEMS (Microelectromechanical systems) microphone, and a multimedia server such that the multimedia server delegates authentication to the secured element, comprising the steps of:

sending an authentication request from the multimedia server to the secured element the authentication request including an authentication binary string;

sending a sound sequence corresponding the authentication binary string from the multimedia server to the sound playing system and playing said sound sequence on the multimedia device;

capturing said sound sequence through the MEMS microphone integrated in a secured element on a single integrated circuit also comprising a security module;

checking by the security module of the integrated circuit the matching of the captured sound sequence to the authentication binary string;

if the captured sound sequence matches the authentication binary string, transmitting an authentication confirmation from the secured element to the multimedia server; and upon receipt of the authentication confirmation, transmitting a multimedia stream from the multimedia server to the multimedia device.

* * * * *